United States Patent
Lopez et al.

(10) Patent No.: US 7,104,447 B1
(45) Date of Patent: Sep. 12, 2006

(54) PARKING METERS, SYSTEMS AND METHODS OF PARKING ENFORCEMENT

(76) Inventors: Anthony Lopez, 315 Capp St., San Francisco, CA (US) 94110; Manuel Quijano, 315 Capp St., San Francisco, CA (US) 94110

( * ) Notice: Subject to any disclaimer, the term of this patent is extended or adjusted under 35 U.S.C. 154(b) by 80 days.

(21) Appl. No.: 10/737,233

(22) Filed: Dec. 15, 2003

(51) Int. Cl.
*G07B 15/02* (2006.01)

(52) U.S. Cl. ............... 235/384; 235/381; 705/13; 705/18

(58) Field of Classification Search ........... 235/384, 235/381; 705/13, 418
See application file for complete search history.

(56) References Cited

U.S. PATENT DOCUMENTS

| | | | |
|---|---|---|---|
| 5,245,268 A | 9/1993 | Wang | |
| 5,646,853 A * | 7/1997 | Takahashi et al. | 455/456.5 |
| 5,648,906 A | 7/1997 | Amirpanahi | |
| 5,777,951 A * | 7/1998 | Mitschele et al. | 368/90 |
| 6,229,455 B1 * | 5/2001 | Yost et al. | 340/943 |
| 6,481,622 B1 | 11/2002 | Hjelmvik | |
| 6,559,776 B1 | 5/2003 | Katz | |
| 2004/0201460 A1 * | 10/2004 | Bucholz et al. | 340/426.1 |
| 2005/0068196 A1 * | 3/2005 | Marin | 340/932.2 |

* cited by examiner

*Primary Examiner*—Karl D. Frech
(74) *Attorney, Agent, or Firm*—Fernandez & Associates, LLP

(57) ABSTRACT

Parking meters detect presence of vehicles in monitored parking spaces and obtain images of license plates. A parking enforcement system communicates with the parking meters and manages use of parking spaces.

25 Claims, 3 Drawing Sheets

PARKING METERS, SYSTEMS AND METHODS OF PARKING ENFORCEMENT

FIELD OF INVENTION

The present invention relates to parking enforcement. More specifically the invention relates to parking meters, systems and methods for controlling usage of parking spaces.

BACKGROUND OF INVENTION

Parking enforcement is a growing problem with the increased development of metropolitan urban and suburban areas, and the increase in numbers of vehicles and drivers. Parking, whether provided by private or governmental entities, is usually available in a wide range of options. For example, some spaces are available for limited time parking, whether paid or for free, others are provided for unlimited parking based on an hourly rate, sometimes with a daily maximum charge, others are restricted to registered or handicapped users.

The different types of parking options dictate various methods of parking enforcement. It is often necessary to employ individuals to facilitate parking enforcement. For example, to enforce limited time free parking, an employee marks parked vehicles and verifies their departure at a later time. Individuals, sometimes referred to as meter maids, need to verify paid parking meters and issue citations or parking tickets to cars parked by unpaid meters, or direct towing of vehicles parked in fire lanes. In other cases, employees collect payment from drivers as they exit paid parking lots or garages. Employment of individuals is expensive for parking providers and introduces the possibility of human errors.

Current parking systems often inconvenience parking users. For example, in the case of parking meters, users often misestimate their parking needs. As a result, they sometimes overpay for parking, or have to pay for a parking ticket. Paid garages and parking lots have only a few exits, since they need to be staffed, which often delays drivers, especially at peak traffic periods.

There is a current need for an efficient parking control system that minimizes or eliminates the number of employees necessary, is convenient to both users and parking providers, is adaptable to a large range of parking options, and is integrated with parking enforcement activities.

SUMMARY OF INVENTION

The present invention relates to parking meters that detect the presence or absence of vehicles in adjacent parking spaces. The meters are capable of obtaining pictures of parked vehicles, which may be identified by their license plates. In some embodiments, the meters receive payment or information from parking users. The meters may also have displays to communicate information to users, such as whether payment was accepted or the time remaining before parking violation is declared. The information obtained by monitoring devices is conveyed to a central system controller. Monitoring parking by these parking meters does not require employment of meter maids.

The present invention also pertains to systems that network many parking meters. Typically, many parking meters transmit information to a central controller that decides whether to allow parking or not based on a number of variables, including the type of parking permitted in specific parking spaces, amount of payment, and parking period. Parking violations are reported to a mail distribution center for enforcement. In some embodiments, users are able to communicate to the controller via a device coupled to the parking meter, and the controller may also be able to communicate to users via a parking meter display. The system can integrate parking meters that enforce different parking options. In some embodiments, the controller may also access parking user accounts to accurately charge for parking use. The system may also be adapted for automatic recognition of some users, or it may enable law enforcement agencies to locate wanted vehicles. The system enables efficient centralized control of parking spaces that may belong to different parking providers.

The present invention also provides a method of parking enforcement based on automatic detection and identification of parked vehicles. In some embodiments, money or data input may be solicited from users. Authorization for parking may then be generated, or parking violations may be reported for enforcement. In some embodiments, law enforcement agencies may access information regarding the location of identified vehicles. The method is scalable for convenient use in multiple parking locations providing various parking options. The parking enforcement method relies on a limited number of employees and minimizes human error potential.

DETAILED DESCRIPTION OF PREFERRED EMBODIMENTS

Figure 1:
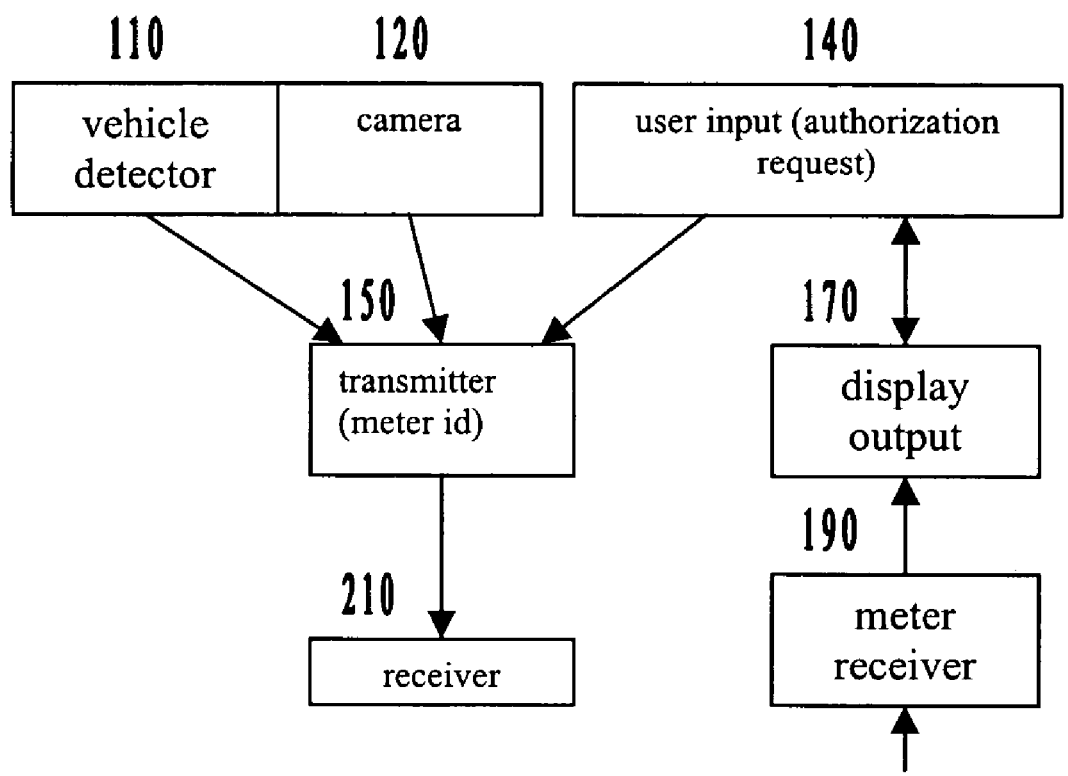
FIG. 1 Schematic diagram of main features of a parking meter.

A parking meter comprises a vehicle detector and a camera for obtaining at least one image of a vehicle parked in a monitored parking space (FIG. 1). In some embodiments, the parking meter may also contain a user input device. These are connected to a transmitter that transmits the respective data to a remote controller. In some embodiments, the parking meters also comprise a display output for communicating to a parking user, and sometimes a meter receiver for communication between the remote controller and the user.

A vehicle presence detector (110) is associated with a parking meter to determine occupancy of the monitored parking space. The vehicle detector may sense a vehicle in any feasible manner, including magnetic, infrared, motion detection, pressure, temperature, or acoustic sensing. In a preferred embodiment the vehicle detector is a pressure sensor. The detector may be placed in various locations, as long as it can accurately sense a vehicle in the monitored parking spot. For example, it may be wholly contained within a body of the parking meter, it may be an in-ground detector within the monitored parking space, or it may be within a curb, pole, cable, or wall. The vehicle detector senses occupancy status of the monitored parking space, i.e. determines if the space is occupied or vacant. When a vehicle is detected, the detector generates a signal indicating that a vehicle is parked in the parking space. Also, in many embodiments, when a vehicle leaves a parking space, the detector generates a signal indicating that the parking space is vacant. The vehicle detector is coupled to a transmitter (150) that transmits the vehicle detector signals generated. Coupling of the vehicle detector to the transmitter can be by any means, including satellite links, global positioning system (GPS) links, cellular or traditional telephone links, copper wire lines or cables, fiber optic links, computer networks or any combination thereof. In a preferred embodiment the vehicle detector is wired to the transmitter.

An imaging device, preferably a camera (120), is also associated with the parking meter. The camera is pointed towards the monitored parking space, and preferably oriented to be able to acquire an image of the bumper area of a parked vehicle, where license tags are usually located. While a single camera often suffices, in some embodiments, for example for monitoring parking along street curbs, it may be desirable to have two cameras to take images of both the front and rear of the parked vehicles. Ideally, the image(s) comprise a license plate of the parked vehicle. The camera may be able to acquire moving or still images, and may operate continuously. However, in a preferred embodiment, the camera shoots a still digital image, and is triggered a little after the vehicle detector senses that the parking space is occupied. In some embodiments, the camera may be capable of rotation or other movements to optimize image acquisition. A light source may also be associated with the camera to illuminate the field photographed if necessary, such as under low light conditions. In most cases, the most important information in the image is the license plate of the parked vehicle, although other features of images may also be useful.

The camera normally communicates the image to the transmitter (150). Coupling of the camera to the transmitter may be by any feasible means, including satellite links, global positioning system (GPS) links, cellular or traditional telephone links, copper wire lines or cables, fiber optic links, computer networks or any combination thereof. In a preferred embodiment the camera is wired to the transmitter. The camera might also be coupled to a meter receiver, described below, so that the controller may direct image acquisition at any time it is needed.

In many embodiments the parking meter also contains an authorization input device (140). In some embodiments, that may be called specialty meters, an authorization input device may be absent or non-functional. Such specialty meters may be used, for example, to monitor parking in fire lanes or in parking spaces in which free parking for a limited time is allowed. The purpose of the authorization input device is to allow parking users to request authorization to park in the monitored parking space. Thus, users input an authorization request that is then transmitted from the parking meter to the controller. The authorization input device is also coupled to the transmitter (150), which is achieved essentially as described above for coupling of the vehicle detectors and cameras.

The authorization input device, and the authorization request produced as a result of user input, may take various forms depending on the parking options available for specific parking spaces. For example, in many embodiments, paid parking is available. Consequently, the input may be a payment input, i.e. the insertion of cash, credit, debit cards, or parking cards. The authorization request includes the amount of money paid.

In such embodiments, it is possible to add a meter controller to the parking meter. The meter controller would be coupled to the authorization input device, and possibly the camera and vehicle detector. The meter controller could then function as a system controller described below, and generate a parking violation signal when it determines that parking in the monitored parking space is unauthorized. In these embodiments, the transmitter may only transmit data if the meter controller declares a parking violation.

In other embodiments, authorization is based at least optionally on user identity. The authorization input is a user identity input. In these cases, the authorization request contains some user identification code that allows the controller to identify the parking user. Identification can be achieved by a variety of methods, including entry of a personal identification code on a keypad or keyboard, swiping an identity card that may be a driver's license or a special parking card. In some embodiments, user identity may be ascertained through bio-information, such as retinal scans, hand or fingerprint recognition, facial or voice recognition. In convenient embodiments, user identification may occur through a radio frequency identification tag (such as those commercialized by Matrics, Columbia, Md., or SCS Corp., San Diego Calif.) that is identified by the authorization input device, so that the user does not have to stop by the parking meter to input information. Alternatively, identification may be achieved automatically from a license plate number extracted from a digital image obtained with the meter camera. In this case, the camera together with license plate extraction feature described below functions as an authorization input device. In some embodiments, the user is prompted to input all or part of the vehicle license plate number. The extracted license plate number is compared to the entered license plate number by verification software, and use is only authorized for vehicles with confirmed license plate numbers.

Personal identification is not necessary in every case, as the user may be identified as a member of a group. This embodiment is desirable, for example, for monthly passes for parking lots or garages or parking spaces with access restricted to some group, such as employees. In other embodiments, the users can have parking user accounts with parking providers. Users identify themselves and their parking use may be recorded to determine the account balance.

In many embodiments, the authorization input device contains both payment and user identity input. The authorization input device may embody various combinations of features and standard components. It may have a central processing unit and various types of memory. To facilitate user interaction, it may have start and stop buttons. The authorization input device may be activated when the vehicle detector senses occupancy.

The authorization input device may be coupled to a display output (170), such as an LCD display for displaying text, and a keypad and/or keyboard for information input. The display may provide information such as parking rates, and a menu may guide users regarding the types of input necessary to obtain parking authorization. Of course, guidance may be also provided by instructions printed, for example, on the parking meter body. The authorization input device may also include card slots and readers that enable use of a card for the payment of parking fees or purchasing of parking credits using, for example, a typical credit or debit card. Additionally, the card slot and reader may be used to read a prepaid card of parking credits or to read a vehicle or user identification card (which may be a driver's license). When a user or vehicle identification card is used, the identification of the user or vehicle may be linked to an account from which parking fees are paid or to a designation of the user or vehicle for which payment of parking fees is not required for authorization. Such accounts may be under management of, or accessed by, the controller. The display output may also be coupled to a meter receiver (190), as explained below. Of course, the display output may be integrated with the authorization input device, such as through use of a touch screen input.

The parking meter also comprises a transmitter (150). The transmitter conveys information received from meter components to a remote receiver. While in a preferred embodiment all meter components communicate through a single transmitter, it is understood that communication from different components might also take place through different transmitters. It is also possible that several meters be coupled to a single transmitter. Because several meters can communicate to a central controller, the controller identifies each meter by a unique identification code. Thus, when conveying information such as occupancy status or images, the transmitter also communicates a unique identification code. The transmitter can communicate by one or several means, including Internet, World Wide Web, intranet, extranet, virtual private network, cellular network, telephone network, fiber optic network, radio frequency, cable network, satellite network, and GPS link. It is also sometimes desirable to encrypt the information sent by the transmitter, especially when transmitting user identity or financial information (e.g. credit card numbers) through means that may be intercepted.

In some embodiments, parking meters have a meter receiver for communicating with the controller (190). Thus, the meter receiver and transmitter enable two-way communication between the parking meter and controller. The meter receivers can communicate also with other components, such as the detector, camera, transmitter, and communication may be via a wired or wireless link, as for the other components. For example, the meter receiver may communicate with the controller via wired or wireless means as discussed herein, such as a satellite link (e.g., a global positioning system). The parking receiver may include standard components such as microprocessor, ROM, and modem. The parking receiver is preferably coupled to the display output (170) to enable communication between the controller and a parking user. The display output, could, for example, show parking violation status or time remaining until the controller generates a parking violation signal. In some embodiments, the parking receiver is able to forward information, such as text messages, to cell phones, pagers, personal digital assistants, or e-mail devices. The display output may also be able to communicate alerts, such as to inform the user that parking space is not available for use (e.g. reserved or off limits) during certain periods of time or beginning at a certain time. For example, a parking space may be off limits for snow removal, street cleaning, roadwork, or truck deliveries. These messages may be transmitted from the controller. The display may also inform users of user parking account status.

Preferably, most components are dimensioned such that they fit within a body of the parking meter. Thus, the parking meter body may contain all or any combination of components, including the vehicle detector, the camera, the authorization input device, the transmitter, the meter receiver, or the display output. Some components may be located outside the main parking meter body, and in some embodiments, such as specialty meters, a parking meter body visible to parking users is not necessary. The body of the parking meter should be sturdy to withstand challenges from the weather and theft or vandalism attempts. While there are many materials that could be used, in a preferred embodiment the parking meter body is encased in a sheet of titanium.

As it is appreciated by those of skill in the art, the parking meter components can have, in various embodiments, standard groups of electronics, including microprocessors and associated memory, antennas, batteries or other power sources, local data storage devices, clocks, or timers. The information from the vehicle detector, the camera, and authorization input device is usually transmitted to the controller. However, in some embodiments the parking meter may use all or some of the information locally, such as for parking authorization. In such embodiments, communication with the controller may be restricted in some cases, such as only to parking violations.

To operate a meter, a user parks a vehicle in a meter-equipped parking space. While the disclosed meter is suitable for automobile parking, it may also be used with minor adaptations for other vehicles such as motorcycles, boats, or planes. Shortly after a vehicle is detected, the camera acquires an image of the vehicle license plate. Specialty meters that monitor restricted parking areas, such as fire lanes, transmit parking occupancy status, including a meter unique identification code, and license plate information to a remote controller for enforcement. For such meters, the meter might be able to recognize and ignore parking by authorized vehicles, such as emergency vehicles. This may be achieved either through the image acquired, or through an input the meter can receive. Specialty meters may also monitor free limited time parking spaces. In this case, meters may send the occupancy status and image to a controller that waits for the limited time before reporting a parking violation. The vehicle detector senses departure of the parked vehicle and reports it to the controller. If vacancy is reported within the limited time, the controller does not report a violation. The meter may also wait for the limited time and then communicate to the controller, the communication being essentially a parking violation alert.

For other meters, when a car occupies a monitored space, as sensed by the vehicle detector, the authorization input device is activated. A menu of possible actions may be provided on the display output. Within a grace period, a user must input the payment or information necessary. Payment may be by conventional means, e.g. through a coin slot or cash acceptor, by sliding a credit, debit, or special parking card. Alternatively, parking users may identify themselves through any means, such as by entry of a personal identification code on a keypad, or sliding an identification card (which may be a driver's license). A user that identifies herself to the meter may receive authorization based on any arrangement between the user and parking providers. The information, especially the user identity information or financial information, is sometimes encrypted prior to transmission to a controller.

After a user inputs all necessary information, the display output may show authorization information that it receives from the controller via the meter receiver. Such authorization information might include, for example, the period of time authorized, as well as upcoming restricted parking periods applicable to the parking space or area. Information regarding lack of authorization, for example because of declined credit card transactions, can also be displayed. In such cases, the users are allowed to input another authorization request.

The parking meter automatically senses when a parking session ends through the vehicle detector. At this point, the controller is reset so as to enable the start of a new parking session. For some meters, the period of parking time used is measured to update parking user accounts or determine the precise amount to be charged.

Figure 2:
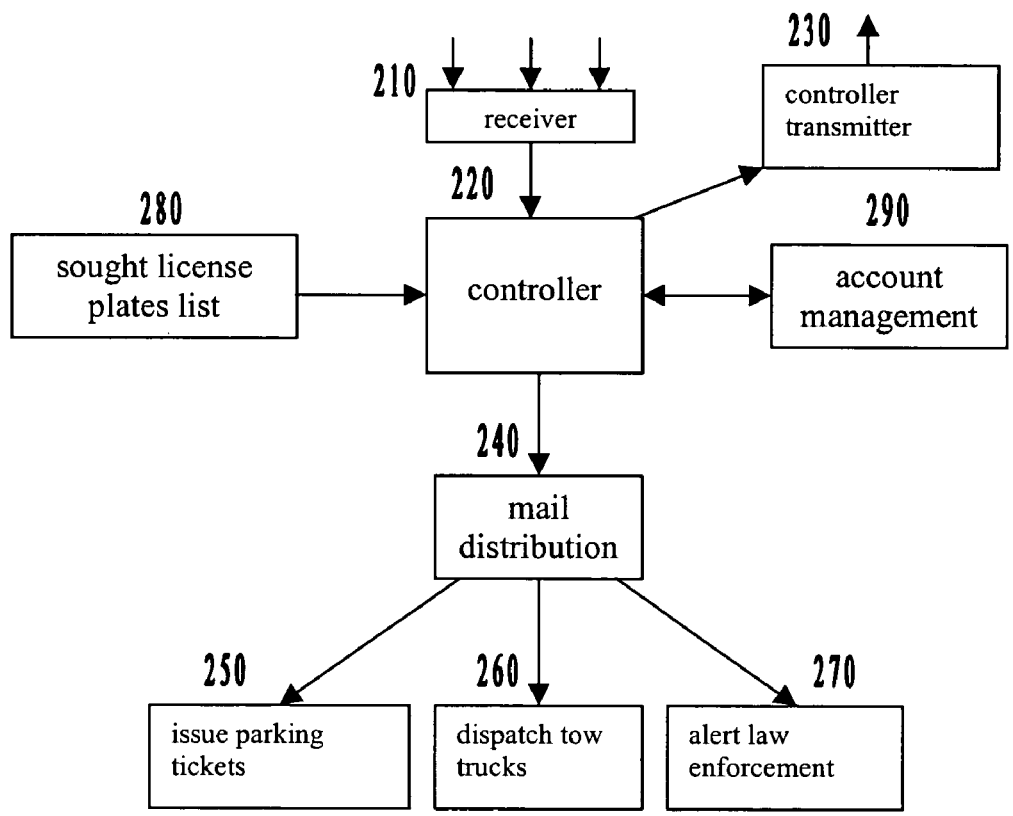
FIG. 2 Schematic diagram of parking enforcement system.

A system for parking enforcement comprises one or more receivers to receive the information sent by transmitters in a plurality of parking meters (FIG. 2). The receivers communicate the received information to a controller. The system comprises a database of parking meters with information regarding specific parking meters, such as their location and type of parking allowed. The controller processes the inputs received from the parking meter and information retrieved from the database, and outputs either a parking authorization or a parking violation signal. Parking violation signals are conveyed to a mail distribution center for enforcement. In some embodiments, the controller is connected to a database of parking user accounts. The controller then decides whether to issue authorization or violation signals in response to information present in specific user accounts. The controller may also be able to update such user accounts, for example by submitting the duration of parking used.

The system comprises a plurality of parking meters, which may be of several different designs, as previously described. Each meter sends data through a transmitter. The system comprises at least one receiver (210) for receiving the data sent from the meters. The receiver communicates with transmitters by any one or several means, including Internet, World Wide Web, intranet, extranet, virtual private network, cellular network, telephone network, fiber optic network, cable network, satellite network, and GPS link. Data received can include the unique identification codes of parking meters, corresponding occupancy status, and corresponding images. The receiver or receivers are coupled to a controller through any means, including satellite links, global positioning system (GPS) links, cellular or traditional telephone links, copper wire lines or cables, fiber optic links, computer networks or any combination thereof. The information received is forwarded to the controller. In some embodiments, data decryption occurs after receipt by the receiver.

The system also comprises a database that includes a list of the parking meters being monitored. Each parking meter contains some unique identification number. Thus, a controller in receipt of information associated with a unique identification number can access database entries associated with the unique identification number. Such database entries may comprise the location of parking meters, and parking permission types. Parking permission types may comprise any type of parking allowed by parking providers. In general, a permission type represents any type of parking arrangement. For example, permission types may be for limited time free parking or unauthorized parking except for emergency vehicles, that may be monitored by specialty meters. Permission types may be for paid parking with different rates, sometimes with a time limit, sometimes with rates being dependent on the time of the day or the day of the week. Other permissions may be restricted to specific users such as for reserved parking or handicapped parking spaces. In some embodiments, the database may also contain modifiable messages that may be sent to parking meters to notify users of restricted parking periods or other information. The database is accessible to the controller.

In many embodiments the system also comprises a timer. One timer coupled to the controller may be sufficient in some embodiments, but several timers may be included, and they may be coupled to parking meters or other components. The purpose of the timer, when necessary, is to clock the amount of time from occupancy of a parking space or payment of parking fees. In some embodiments, the timer may also provide time and calendar information. The timer is also useful in some embodiments to measure grace periods from occupancy to attempts to request authorization.

A controller is a central computer system that serves as a central monitor and processor of system resources (220). A central computer system may contain a single computer, or it may comprise several computers, processors, and/or servers, and there may be several such devices collocated, remote to each other, or some combination thereof. Each monitored parking space is uniquely identified so that the controller can make specific determinations of which parking spaces are being used without authorization.

The controller can receive input from many system components. The controller obtains from the receiver information that contains parking meter unique identification codes, occupancy status, image and possibly authorization requests. Based on the unique identification code, the controller accesses the database and retrieves corresponding database entries, such as corresponding permission types. The controller can also access the timer for information such as time of day, or to determine duration of occupancy. The controller processes the input received according to different software associated with different permission types. As a result, the controller either authorizes parking or issues a parking violation signal. In some embodiments, the controller may prompt users to input alternative authorization requests before issuing a violation signal. In many cases, the controller issues a violation signal only after expiration of the paid parking period, unless during this period it receives and accepts additional authorization requests from the parking meter. For example, if the authorization request consists of a cash payment, the controller may authorize parking for a limited time that depends on the parking rate registered in the permission type.

The controller may send authorization and/or parking violation information to the parking meter via a controller transmitter. The controller sends parking violation information to a mail distribution center.

In some embodiments, the system may contain a controller transmitter (230). The controller transmitter may enable two-way communication between the controller and parking user. The transmitter communicates to specific parking meters based on their unique identification code. Communication may be by any means, such as those listed above for the receiver. Consequently, the controller may be able to prompt users for alternative inputs, send any information to specific users, such as parking account information, inform users of the time authorized or time remaining until a violation is declared.

The parking violation signals generated by the controller are sent to a mail distribution center (240). The parking violation information sent to the mail distribution center may include, for example, the image or extracted license plate information, the location of the parking meter, the date and time the parking violation was declared, or the duration of parking occupancy after the parking violation was declared. The mail distribution center enforces parking. Accordingly, the mail distribution center may send citations or parking tickets to registered owners of vehicles, based on license plate information from corresponding images (250). Additionally or alternatively, the mail distribution center may dispatch tow trucks to parking meter locations (260). In some embodiments, the mail distribution system receives in addition to information regarding parking violation, information regarding the location of sought vehicles, as described below.

In some embodiments, the system comprises a database of parking user accounts (290). Users set up their accounts according to agreements with parking service providers. The database of parking user accounts contains user identification information or codes, which may be any unique information, such as account numbers or personal identification numbers, license plate or driver's license numbers or parts thereof. In these embodiments, the controller receives authorization requests from parking meters that contain indications of user identity. The controller accesses database of parking user accounts and retrieves information regarding specific users and uses it to determine whether or not to authorize parking. Such information may comprise, for example, an amount of prepaid parking purchased, or user access to restricted parking spaces. In some embodiments, the controller may also enter information in the database of parking user accounts regarding parking by specific users, such as duration of parking and corresponding parking permission types. Thus, the controller may update user account information.

The image obtained at the parking meter is submitted to the controller. The image preferably comprises a license tag of the parked vehicle. In a preferred embodiment, the image is a digital image. The license plate number can be extracted from the digital image. Extraction can be accomplished by digital image processing software that may identify the license plate in the image, based in part on the standard size, shape, and maybe color of licenses. The digital image is of sufficient resolution to allow extraction of the license plate number by optical character recognition applications. The extraction software may also recognize the licensing state based on its license plate location, smaller font size used, and limited number of possibilities. The extraction, when performed, may be carried out in different embodiments at the parking meter, controller, or mail distribution center.

In some embodiments the extracted license plate number is part of the information forwarded to the controller. The controller can use the license plate number for several purposes. In one embodiment, the license plate number may be used for identification, so that a user does not have to operate an authorization input device. In other embodiments, the controller may use the license plate number to verify that a user account is utilized for authorized vehicles. Accordingly, parking user account access might be denied unless the parked vehicle is specified in the account.

In some embodiments the system comprises a list of sought license plate numbers that are provided by law enforcement agencies. For example, license plate numbers of stolen vehicles might be part of the list. For each extracted license plate number of parked vehicles, the controller compares the license plate number to the numbers on the list of sought license plate numbers. When the controller finds a match, it generates a sought license plate matching signal, which is sent to the mail distribution center. In these embodiments, the mail distribution center is able to communicate, sometimes automatically, to law enforcement agencies the license plate number, the parking meter location, time of parking, as well as any other available information (270).

For example, the system may be integrated with Amber Alert Plans. Accordingly, if a child is kidnapped and considered endangered, law enforcement officials launch an Amber Alert. Broadcasting media then immediately provide the public with information, such as a description of the suspect and his vehicle, so that millions of people can be on the lookout for the vehicle and child. The parking enforcement system may be integrated with Amber Alert Plans in at least one of two ways. First, when the license plate of the vehicle is known, the license plate may be included as above in the database of sought license plates. The location of the vehicle sought by the Amber Alert can then be immediately traced. Second, in some embodiments parking meters may be used as broadcasting media. Thus, the display output may convey critical details about the Amber Alert, notifying parking users to be on the lookout for the suspect and abducted child. Critical Amber Alert details that may be displayed, depending on the type of display output, may include a descriptions of the victim, suspect, description of the vehicle involved that may include color, make, model, license plate number, and distinguishing features, and/or pictures or composite sketches.

The system monitors a plurality of parking spaces. A monitoring cycle begins when the controller is alerted to the presence of a vehicle in a monitored parking space. Depending on the associated parking option to be enforced, the controller may wait a grace period until it receives an authorization request from the corresponding parking meter. The authorization request may contain, for example, the amount of the payment at the meter or user identity information. Alternatively, the controller may determine user identity information from the image, especially from the license plate number extracted from a digital image.

A parking permission type is associated with specific parking spaces, which may include different parking rates for different time periods. Respective parking permission types are known to the controller. The controller decides whether or not to authorize occupancy of a parking space based on several factors, such as the authorization request, the license plate number, user account information, time of day and special parking conditions related to specific meters. Authorization may be given for limited periods of time. During this period, depending on permission types associated with specific parking meters, the user may or may not be allowed to send additional authorization requests to extend the duration of the parking session, such as by inserting more coins into the meter. As long as the controller authorizes use of a given space, the controller will consider the use by a vehicle in that parking space to be valid. The controller may send an authorization confirmation and other information to the meter to be shown on a meter display output. A violation occurs when a vehicle is detected in a given parking space but an authorization is not provided within some predefined period of time (2–10 minutes, for example), or if authorization is given for a limited time that has expired. Through the vehicle detector, the controller is informed when a parking session is over, i.e. when a car vacates the parking space, and the controller is reset with respect to that parking meter to begin a new parking session. The controller may use the end of the parking to calculate parking duration and update parking user accounts.

Figure 3:
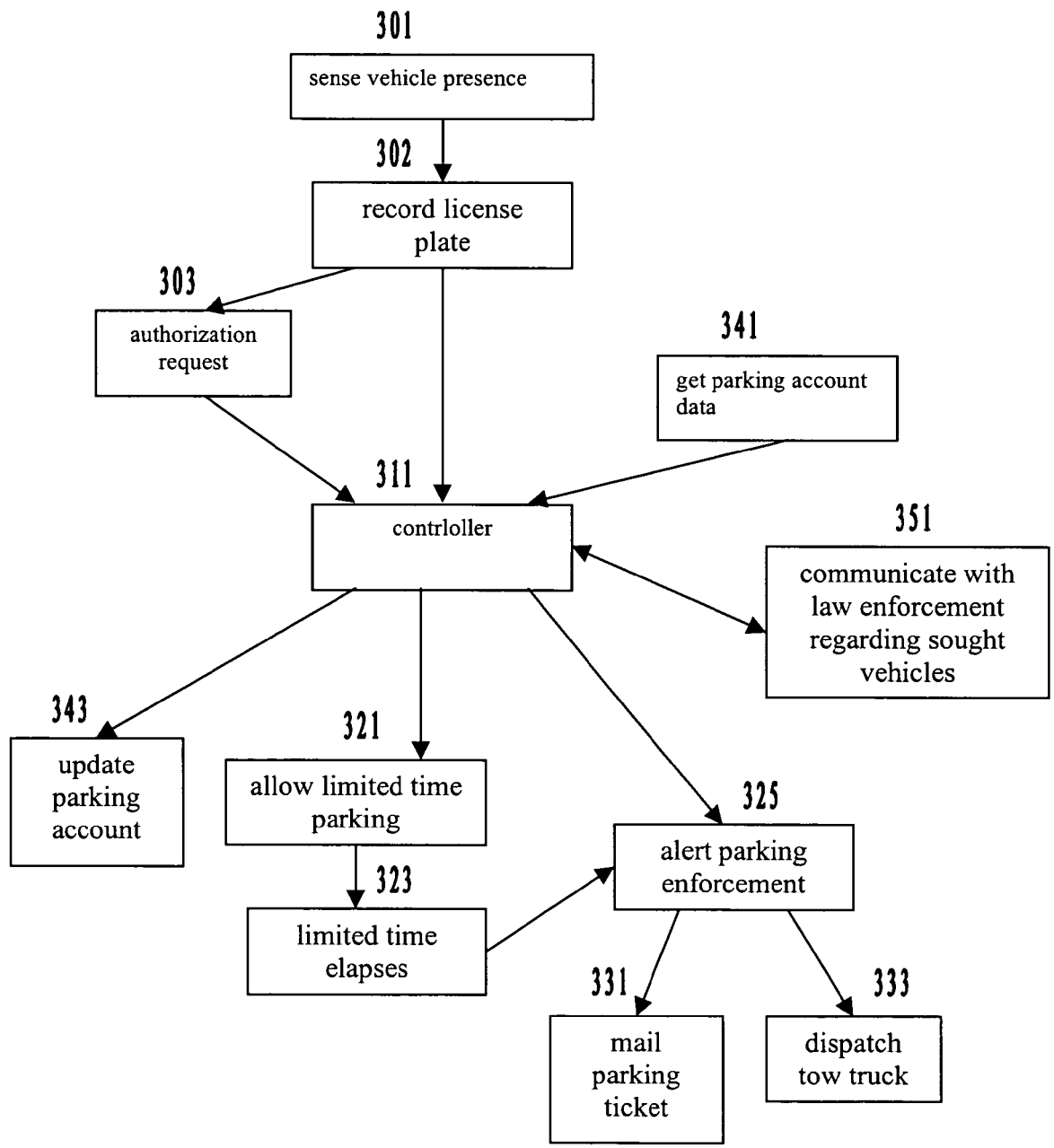
FIG. 3 Schematic diagram of method of parking enforcement.

A method for parking enforcement according to the present invention comprises the following steps (FIG. 3): detecting parking of a vehicle in a monitored parking space, getting an image of the vehicle that ideally includes the vehicle license plate, optionally getting parking user input, deciding based on the parking meter location, time of parking, and sometimes duration of parking and sometimes user input whether to authorize parking or not, automatically generating a parking violation signal if parking is not authorized, and enforcing the parking violation based at least in part on the image.

Parking enforcement begins with obtaining an indication of vehicle presence (301). Presence or absence of a vehicle in a monitored parking space is determined with a vehicle detector as described above. The vehicle detector produces a signal at the beginning of a parking session, and a different signal at the end of a parking session.

In the image acquisition step, a camera obtains a picture of the parked vehicle (302). Shooting the image is preferably triggered shortly after presence of a vehicle in the monitored parking spot is detected.

In many embodiments, an additional step comprises obtaining an authorization request from a parking user (303). Such an authorization request may be, for example, in the form of payment by any means or parking user identification.

Another step is communicating the vehicle presence, image, and authorization request to a controller (311). This communication might occur immediately after the information is obtained, or at some time thereafter. Alternatively, communication may be triggered by sets of circumstances, such as expiration of parking time purchased prior to departure of the vehicle from the monitored parking spaces.

A next step is selectively generating by the controller a parking violation signal. The controller selects the instances where parking violation occurs based on a number of factors. One such factor is the location of the parking meter, which dictates parking rates and allowable parking durations, if any. Another factor is duration of occupancy (321, 323). In some embodiments, the controller also evaluates the content of authorization requests to selectively generate parking violation signals. In some embodiments, the controller evaluates information contained in parking user accounts to selectively generate parking violation signals (341). In these cases, the controller accesses one or more databases of parking user accounts, based on parking user identification codes that are part of the database and also part of authorization requests. In these embodiments, the controller may be able to update specific parking user accounts based on parking use, which may be based on a measurement of the duration of parking sessions (343). In other embodiments, the controller also considers the license plate numbers of the parked vehicles to selectively generate parking violation signals.

Parking violation signals, when generated, are communicated to a mail distribution center (325). The mail distribution center then takes action to enforce parking, which may be mailing parking tickets to registered owners of vehicles that are identified form the license plate of corresponding images (331). The mail distribution system may also inform towing services of the location of vehicles to be towed (333). In some embodiments, as discussed below, the mail distribution system informs law enforcement agencies of the presence and location of sought vehicles.

In some embodiments, license plate numbers of parked vehicles are extracted from digital images. The extracted license plate numbers may be used, as mentioned above, to confirm identity of users and authorize parking. License plate numbers may also be compared to one or more license plate numbers of sought vehicles (351). Sought vehicle license plate numbers may come as part of an Amber Alert Plan. If an extracted license plate number matches a license number, then a sought license plate matching signal is generated, which is communicated to the mail distribution center. The mail distribution center can then alert law enforcement agencies or other interested parties regarding the location of the sought vehicles.

The present invention provides for versatile parking control. The invention allows elimination or minimization of the need for employees to monitor parking. Parking enforcement can be carried out more promptly and efficiently. Some embodiments may be readily adopted by parking providers with little need for expensive infrastructure. Many independent parking providers may integrate their enforcement operations resulting in considerable cost reductions. Some embodiments of the invention are very convenient for parking services users, with little or no time required to operate a parking meter. In some embodiments the invention is interfaced with important law enforcement activities, such as Amber Alert Plans. Finally, the invention is compatible with large numbers of exits from parking lots and garages, thus improving traffic.

Foregoing described embodiments of the invention are provided as illustrations and descriptions. They are not intended to limit the invention to precise form described.

Other variations and embodiments are possible in light of above teachings, and it is thus intended that the scope of invention not be limited by this Detailed Description, but rather by the following Claims.

What is claimed is:

1. A parking meter for monitoring an adjacent parking space comprising:
   a transmitter,
   a unique identification code,
   a vehicle presence detector for conveying occupancy status of the adjacent parking space, the vehicle presence detector being coupled to the transmitter,
   a camera for acquiring at least one image of a license plate of a vehicle parked in the adjacent parking space, the camera being coupled to the transmitter,
   an authorization input device for producing an authorization request, the authorization input device comprising a user identity input, the authorization input device being coupled to the transmitter
   wherein the transmitter can communicate the unique identification code, the occupancy status, the image, and the authorization request to a receiver.

2. The parking meter according to claim 1, wherein the transmitter can communicate via one or more of: Internet, World Wide Web, intranet, extranet, virtual private network, cellular network, telephone network, fiber optic network, cable network, satellite network, and GPS link.

3. The parking meter according to claim 1, comprising additionally a light source to illuminate the license plate when acquiring the image.

4. The parking meter according to claim 1, wherein the authorization input device comprises a payment input.

5. The parking meter according to claim 1, comprising a display output coupled to the authorization input device.

6. The parking meter according to claim 5, comprising a meter receiver coupled to the display.

7. The parking meter according to claim 1, comprising a parking meter body encased in a sheet of titanium.

8. A system for parking enforcement comprising:
   a plurality of parking meters, each parking meter comprising
      a transmitter,
      a unique identification code,
      a vehicle presence detector for conveying occupancy status of an adjacent parking space, the vehicle presence detector being coupled to the transmitter,
      a camera for acquiring at least one image of a license plate of a vehicle parked in the adjacent parking space, the camera being coupled to the transmitter,
      wherein the transmitter can communicate the corresponding unique identification code, the occupancy status, and the image;
   at least one receiver for communicating with the transmitter, a database comprising
    the plurality of unique identification codes,
    a parking meter location associated with each unique identification code, and
    a parking permission type associated with each unique identification code, a timer to measure a duration of occupancy,
a controller coupled to the database, the receiver, and the timer, the controller selectively generating a parking violation signal as a function of the corresponding occupancy status, permission type, and duration of occupancy, and
a mail distribution center that receives from the controller the parking violation signal, the corresponding parking meter location, and the image.

9. The system according to claim 8 wherein the mail distribution center responds to the parking violation signals by least one of dispatching tow trucks to the parking meter location and sending parking tickets to owners of vehicles.

10. The system according to claim 8 wherein at least a subset of the plurality of parking meters each additionally comprises an authorization input device for producing an authorization request, the authorization input device being coupled to the transmitter, wherein the transmitter can communicate the authorization request to the receiver, and the controller generating the parking violation signal additionally as a function of the corresponding authorization request.

11. The system according to claim 10 wherein the authorization input device is a payment input.

12. The system according to claim 10 comprising a database of parking user accounts coupled to the controller, each user account having an associated user identity code and user account information, wherein the authorization input device is a user identity input for entering the user identity code, the controller generating the parking violation signal additionally as a function of user account information, and the controller being capable of updating the user account information.

13. The system according to claim 12, wherein the image is a digital image, the license plate number is extracted from the digital image, and the controller generates the parking violation signal additionally as a function of the extracted license plate number.

14. The system according to claim 10, comprising at least one controller transmitter and wherein at least a subset of the plurality of meters have meter receivers for communicating with the controller transmitter, and output displays coupled to the meter receivers.

15. The system according to claim 14, further comprising a database of critical Amber Alert details coupled to the controller, whereby the critical Amber Alert details can be shown on the output displays.

16. The system according to claim 8, wherein the image is a digital image and the license plate number is extracted from the digital image, the system comprising a list of one or more sought license plate numbers coupled to the controller, and wherein the controller compares extracted license plate numbers to each sought license plate number to generate a sought license plate matching signal, and the mail distribution system receives the sought license plate matching signal.

17. The system according to claim 16 wherein the one or more sought license plate number is a critical Amber Alert detail.

18. A method for parking enforcement comprising:
communicating from a monitored parking space to a controller a vehicle presence indication and an image of a license plate of a parked vehicle,
retrieving by the controller from a database a permission type associated with the monitored parking space,
selectively generating by the controller a parking violation signal as a function of permission type and duration of occupancy, and
communicating the parking violation signal to a mail distribution center.

19. The method according to claim 18 further comprising communicating from the monitored parking space to the controller an authorization request to the controller, and wherein selectively generating the parking violation signal is as a function additionally of the authorization request signal.

20. The method according to claim 19 further comprising
encrypting the authorization request after obtaining the authorization request, and
decrypting the authorization request after communicating the authorization request.

21. The method according to claim 19 wherein the authorization request signal comprises a parking user identification code, the method comprising
accessing by the controller a database of parking user accounts comprising parking user identification codes associated with parking user account information, and
selectively generating by the controller a parking violation signal as a function additionally of the parking user account information.

22. The method according to claim 21 comprising
measuring parking duration,
transmitting the parking duration and the parking user identification code to the database of parking user accounts, and
updating the account information associated to the parking user identification code.

23. The method according to claim 21 further comprising extracting a license plate number from the image, and wherein the license plate number is the user identification code.

24. The method according to claim 18 comprising
extracting a license plate number from the image,
comparing the extracted license plate number to one or more sought license plate number,
generating a sought license plate matching signal when the extracted license plate number matches the sought license plate number,
communicating the sought license plate matching signal to the mail distribution center.

25. The method according to claim 24, wherein the sought license plate number is a critical Amber Alert detail.

* * * * *